United States Patent [19]

Korbelak et al.

[11] 4,319,951
[45] Mar. 16, 1982

[54] FIBER ORGANIZER FOR SPLICE CASES AND TERMINALS

[75] Inventors: Kenneth N. Korbelak, Jackson; Joseph B. Masterson, Carteret, both of N.J.

[73] Assignee: GK Technologies, Incorporated, Greenwich, Conn.

[21] Appl. No.: 145,009

[22] Filed: Apr. 29, 1980

[51] Int. Cl.³ .................. G02B 5/16; B65H 69/06
[52] U.S. Cl. .............................. 156/502; 65/36; 65/4.21; 29/464; 156/158; 269/903; 350/96.15; 350/96.21; 350/96.22
[58] Field of Search ............. 156/157, 158, 304.1, 156/304.6, 296, 499, 502; 65/4 R, 4 A, 12, 36, 152; 29/447, 461, 462, 464, 466, 467, 468; 269/43, 45, 321 WE, 903; 350/96.1, 96.15, 96.2, 96.21, 96.22

[56] References Cited

U.S. PATENT DOCUMENTS

| | | | |
|---|---|---|---|
| 3,680,193 | 8/1972 | Scaminaci et al. | 269/45 |
| 4,078,910 | 3/1978 | Dalgoutte | 65/3 A |
| 4,152,190 | 5/1979 | Kurosawa | 156/366 |
| 4,171,867 | 10/1979 | Cocito | 350/96.21 |
| 4,172,746 | 10/1979 | Le Noane et al. | 156/91 |
| 4,217,030 | 8/1980 | Howarth | 350/96.21 |

OTHER PUBLICATIONS

"Holding Fixture for Optical Fiber Array Connectors", Technical Digest No. 52, p. 7, by Freeman et al., Western Electric, Oct. 1978, Murray Hill, N.J.

*Primary Examiner*—John E. Kittle
*Attorney, Agent, or Firm*—Hopgood, Calimafde, Kalil, Blaustein & Judlowe

[57] ABSTRACT

Conventional communication cables must be spliced and so must fiber optic cables. Special care must be taken at splice points or locations so as not to cause faults in the optical fibers and still have an organized packaging and splicing arrangement. Optical fibers, unlike copper wire conductors, have memory. This causes a problem, for example, since one can splice a copper pair, coil it up or place it in a splice case, and it will stay. If the same thing is done on an optical fiber, it will not stay as placed and in fact will recoil like a spring. This invention comprises a fiber organizer, made up of a series of channels, and it can accommodate and secure individual spliced fibers from each length of the optical cables. Also the organizer provides a fiber splice support section in which the splices are placed upon completion.

10 Claims, 5 Drawing Figures

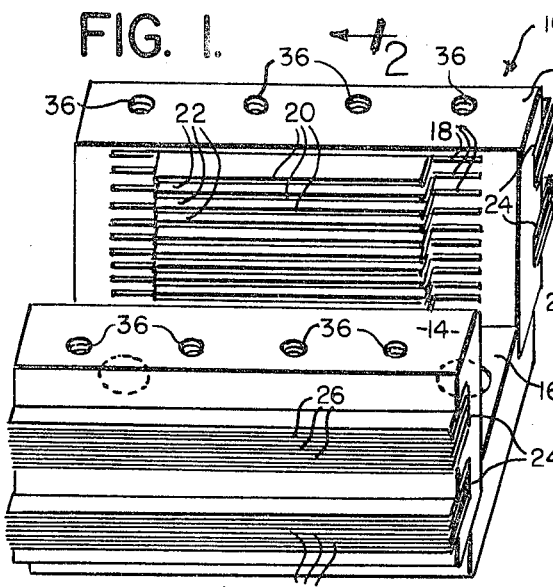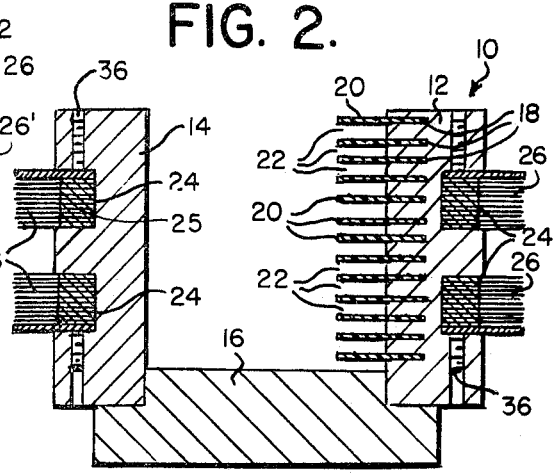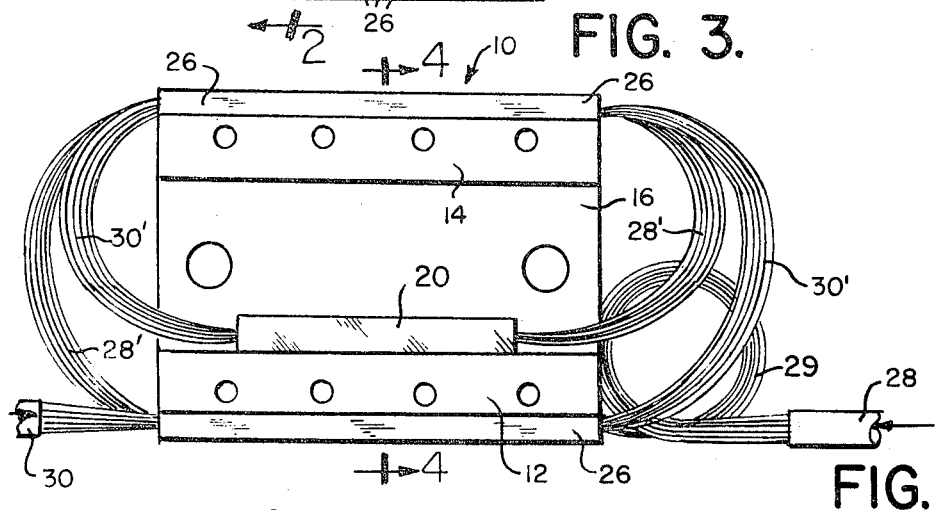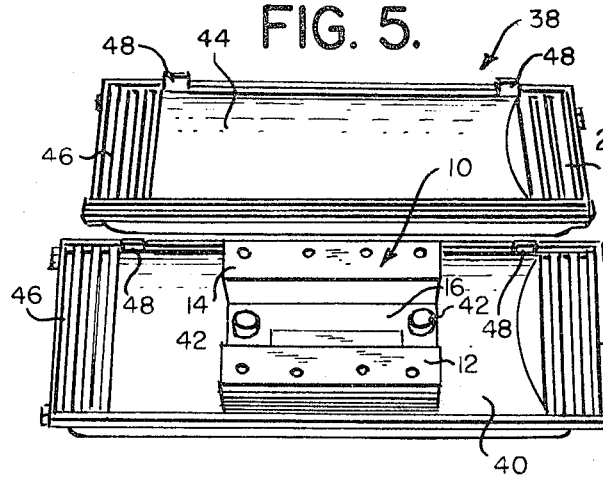

FIBER ORGANIZER FOR SPLICE CASES AND TERMINALS

BACKGROUND AND SUMMARY OF INVENTION

This invention provides an optical-fiber organizer and splice holding structure within a splice case for field use. The organizer can be of either metallic or non-metallic construction. There are also provisions for strength-member tie-offs to the organizer, or the strength member for each of two cables to be joined may be tied, one to the other, thereby directly by-passing the organizer. Thus, the organizer makes possible the orderly and systematic storage of a reserve length of optical fibers and simultaneously provides a protected splice area. It is advantageous to use small fiber-optic light conductors because this permits a greater number of transmission circuits for a given cable size.

In practice, generally a Number 26 AWG or Number 28 AWG metal wire has been the smallest size in general use for telephone work. Recently, fiber-optic cable has made a place for itself in the communication-cable market. A fiber-optic cable is made up of a series of fine glass fibers buffered with a plastic and then usually stranded over a central strength member, covered by an outer jacket. Some fiber-optic cables are reinforced with steel, Kevlar, or aluminum tubing, and may also be filled with various water-blocking compounds.

Assuming the right type fiber and a fiber count of 12, with the fiber-optic cable having an outside diameter of 0.300 inch, this cable could replace a wire cable with 225 pair of conductors and having an outside diameter of 2 inches. Because of their small size, fiber-optic cables can also be utilized in much greater lengths than conventional communication cables, thus cutting shipping, handling and installation costs. The real advantage of a fiber-optic cable is the extremely low loss and high bandwidth characteristic of the cable, thus reducing the number of highly expensive repeaters needed along the cable route.

However, there is a difference in joining two sections of fiber-optic cable together, as opposed to metallic-wire cables. The glass fiber contained in the fiber-optic cable cannot just be bunched, tied, wrapped and shoved into a splice case, as with conventional metallic conductors. Small-diameter glass fibers cannot be crimped and bent at sharp angles, or fiber breaks will occur. Glass fibers have memory and always want to return to straight-line position, and it is very difficult to coil and wind glass fibers in a splice case, without fiber damage. This invention makes possible the easy accumulating, storage and handling of reserve fiber length within the splice case. The invention also offers a substantial amount of physical protection to the optical fiber before, during and after the splicing operation, and in the event of splice-case re-entry.

A device is needed at the splice location, for the orderly storage of reserve fiber length to be utilized, for example, in the event of a fiber break. The purpose of this invention is to provide means for novel handling, storage, and accumulation as well as mechanical protection for reserve lengths of individual fibers contained in a splice case at fiber-optic splicing locations.

Other objects, features and advantages of the invention will appear or be pointed out as the description proceeds.

BRIEF DESCRIPTION OF DRAWING

In the drawing, forming a part hereof, in which like reference characters indicate corresponding parts in all the views;

FIG. 1 is an isometric view of an organizer for holding fiber-optic strands before and after splicing;

FIG. 2 is a sectional view taken at the plane 2—2 of FIG. 1;

FIG. 3 is a top plan view of the organizer of FIG. 1, accommodating reserve fiber lengths, and in an aspect reversed 180° from that of FIG. 1;

FIG. 4 is a sectional view on the line 4—4 of FIG. 3; and

FIG. 5 is a perspective view on a reduced scale, showing the organizer located in an opened splice case.

DESCRIPTION OF PREFERRED EMBODIMENT

FIG. 1 shows a fiber optic organizer 10 with a rearward wall 12, a forward wall 14 and a bottom 16 which is permanently secured to the lower ends of the walls 12 and 14 to make the organizer a unitary structure. In the preferred construction, the walls 12 and 14 and the bottom 16 are made of plastic.

There are parallel channels 18 formed in the rearward wall 12, and partitions 20 extend into the channels 18 to secure the partitions 20 to the wall 12, so that the partitions 20 extend beyond the front face of the wall 12. The partitions 20 are parallel to one another, thus defining channels 22 between the partitions 20 for retaining each fiber splice via a protective sleeve 68 therefor (FIG. 4).

There are other channels 24 in the outside of the rearward wall 12 (FIG. 2), and spaced partitions 26 extend beyond the rearward wall 12, the spacings being established by spacers or shims 25 between corresponding edges of the partitions 26; these spacers are preferably of thickness 0.001–0.002 inch less than the diameter of individual optical fibers, so that adjacent partitions 26 are so spaced from one another as to enable light frictional removable engagement and support of each individual fiber. Each of the individual fibers of the cables 28 and 30 is held between the respective partitions 26 in the upper and lower channels 24; and primed notation 28'-30' identifies fibers of their corresponding cables 28-30.

The front wall 14 has no channels on its inside face corresponding to the channels 18 of the rearward wall 12; but it does have upper and lower channels corresponding to the channels 24 of the rearward wall 12, and partitions 26 are permanently assembled to the channels 24 in the front wall 14 as already described in connection with FIG. 2.

FIG. 3 is a plan view (180° reversed from the sense of FIG. 1), showing the fiber-optic cables 28 and 30 with their individual optical fibers 28'-30' separated from one another and retained between the partitions 20-26 which extend from channels 18 and 24. For example, the individual optical fibers 28' from the cable 28 can be separated, so that they extend between the individual partitions 26 of the rearward wall 12 in FIG. 3 and then curve in the clockwise direction to enter the left-hand end of the partitions 26 of the forward wall 14; these individual optical fibers 28' of cable 28 further extend in a half bend, with their ends spliced (to corresponding ends of fibers 30') and protected between partitions 20. Similarly, the individual fibers 30' of cable 30 can be separated for individual accommodation between partitions 26 of the rearward wall 12 and then curve counterclockwise to enter the right-hand end of the spaces between partitions 26 of the forward wall 14; these fibers 30' further extend in a half bend for spliced and protected connection to the ends 28', between partitions 20. The optical fibers 28' of cable 28 correspond in number to the number of channels between partitions 26 in the channels 24 of the outside surfaces of the walls 12 and 14, so that there can be a fiber-optic strand in each of the upper or lower channels of each of the forward and rearward walls 14 and 12.

In order to accommodate further reserve fiber length of the cable 28, the fibers of this cable have a loop 29 (adjacent cable 28 entry) just before the cable fibers 28' enter the organizer 10, and a similar loop (not shown) may be provided adjacent cable 30 entry for the same purpose.

For best organization, we prefer that individual fiber-optic elements 28' be accommodated in the lower channel 24 (FIGS. 1 and 2) of wall 12; and, then, after curving upward and to the right (i.e. clockwise) in FIG. 3, the individual fibers 28' pass through the corresponding (lower) channel of wall 14. Similarly, from spliced and protected connections of corresponding fiber ends 28'-30' (retained at channels 20), the fibers 30' exit from channels 20 with a clockwise bend for left-end entry into the spaces between partitions 26 of the upper channel 24 of wall 14, and they then bend again for right-to-left passage through similar spaces associated with the upper channel 24 of wall 12, before exiting as cable 30.

The partitions 26 that extend into the channels 24 have a shim 25 between each of the partitions 26; this leaves a width between partitions equal to or slightly smaller than the diameter of each of the fiber optic elements. The shims 25 and partitions 26 are held in their grooves 24 in the outside surfaces of the walls 12 and 14, being clamped by retaining elements or set screws 36 which press against the partitions 26 and the shims 25 to form channels for receiving the fiber optic filaments. The ends of these set-screw elements 36 do not extend beyond surfaces of the walls 12 and 14 because any protruding portion of the organizer is a hazard, should a fiber-optic element catch on it when being moved around for welding, inspection or any other purpose. The partitions 26 and the shims 25 between the partitions fit snugly in the channel 24 in the walls of the organizer, and the elements 36 will be understood to so clamp the partitions and shims as to avoid their dislocation from or displacement lengthwise of the channels 24.

FIG. 4 is a section taken on the line 4—4 of FIG. 3. All of the elements in FIG. 4 have been identified in other figures, but the purpose of FIG. 4 is to show the way in which the individual elements of the fiber-optic cables are held in the channels of the organizer.

The organizer 10 is constructed for use with fiber-optic cables having from 1 to 15 individual optical fibers; and FIG. 4 shows the individual optical fibers held in their individual channels, between the respective partitions in the upper and lower channel 24. These individual fibers are marked with the reference characters 28'-30', but for clarity only a few of the strands 28'-30' are marked with lead lines.

FIG. 5 shows the organizer 10 mounted in a splice case 38 which will be recognized as a splice case conventionally used to contain wire splices for standard telephone cable. Case 30 includes a lower housing 40 to which the organizer is connected by fastenings 42. There is seen to be space beyond both ends of the organizer 10 in the lower housing 40 to accommodate the relatively long arcs of curvature of the optical fibers 28'-30' of both cables 28 and 30, as well as one or more end loops 29. A cover 44 fits over the lower section 40 of the splice case 38, and end walls 46 have tongue-and-groove interfit so as to enclose an airtight chamber for the organizer; and it will be understood that cables (28-30) are led into housing 38 through wall openings which can be sealed after the housing is closed. Fastenings 48 on the longitudinal walls of the housing 38 engage with beaded edges of the upper and lower parts of the housing 38 to secure the housing parts 40 and 44 together.

The preferred embodiment of the invention has been illustrated and described but changes and modifications can be made and some features can be used in different combinations without departing from the invention as defined in the claims.

What is claimed is:

1. Organizer apparatus for the orderly arrangement of reserve lengths of single or multiple fiber optic conductors including in combination an organizer body including two walls spaced from one another, a first plurality of spaced partitions extending along the outer surface of one of said walls, a corresponding plurality of spaced partitions extending along the outer surface of the other of said walls, the spacing between said partitions being sized for light frictional releasable engagement of individual optical fibers, a plurality of further-spaced partitions extending along the inner surface of one of said walls, jacketed fiber-optic cable means comprising an unjacketed length between jacketed lengths, thereby exposing individual optical fibers throughout the unjacketed length, and the unjacketed length being greater than five times the length of said body, the individual unjacketed fibers being coiled in at least two complete oval loops having opposed longitudinal sides, with a third partial loop in longitudinal overlap with one of said longitudinal sides, the jacketed lengths terminating adjacent opposite longitudinal ends of said one longitudinal side and wall, the fibers of a first loop adjacent one jacketed length and those of a second loop adjacent the other jacketed length being individually received and removably retained in the spaces between partitions of the other surfaces of both walls, thus leaving an intermediate partial loop between said first and second loop, and the fibers of said intermediate partial loop being received between the further-spaced partitions extending along the inner surface of said one wall.

2. The apparatus described in claim 1 characterized by grooves channeled in the outer sides of said walls, and a plurality of parallel partitions in the channels and dividing the channels into sub-channels into which individual fiber optics are held separated from one another.

3. The apparatus described in claim 2 characterized by shims spacing the parallel partitions in each channel, the partitions extending outwardly of each channel and of each shim to define fiber-receiving spaces between adjacent partitions.

4. The apparatus described in claim 3 characterized by set-screw clamping means in each wall and acting on the associated partitions and interposed shims to hold the partitions in the grooves and against movement with respect to the walls.

5. The apparatus described in claim 4 characterized by there being several set screws in longitudinally spaced array, and spaced from the ends of the grooves, for holding associated partitions and shims against displacement with respect to the grooves.

6. The apparatus described in claim 5 characterized by the set screws being fully contained within openings in the walls, whereby no set screw is in a position at which an optical fiber could catch and break during positioning of individual or groups of optical fibers.

7. The apparatus described in claim 1 characterized by the unjacketed length being sufficiently greater than five times the length of said body that a loop of unjacketed fibers is accommodated at one longitudinal end of the organizer, between said one longitudinal end and the adjacent jacketed cable.

8. The apparatus of claim 1, in which the unjacketed length includes generally centrally located splices of corresponding fibers of two separate jacketed cables, and in which the fibers of said intermediate partial loop include the spliced ends of corresponding fibers of both cables.

9. The apparatus of claim 8, in which protective sleeves overlap the spliced ends of corresponding fibers, the spacing between said inner-surface partitions being sized for light frictional individually releasable engagement with said sleeves.

10. A fiber-optic organizer for the orderly arrangement of reserve lengths of single or multiple optical fibers, comprising a rigid body of generally U-shape defined by two spaced upstanding walls and a bottom connection therebetween, a first plurality of spaced partitions extending along the outer surface of one of said walls, a corresponding plurality of spaced partitions extending along the outer surface of the other of said walls, the spacing between said partitions being sized for light frictional releasable engagement of individual optical fibers, and a plurality of further-spaced partitions extending along the inner surface of one of said walls, the spacing of said last-mentioned partitions being sized for light frictional releasable engagement of protective-sleeve enshrouded splicings of individual optical-fiber ends.

* * * * *